United States Patent [19]

Winkler

[11] 3,997,389
[45] Dec. 14, 1976

[54] CONCENTRATING SODIUM OR POTASSIUM HYDROXIDE

[75] Inventor: Robert Winkler, Wallisellen, Switzerland

[73] Assignee: Escher Wyss Limited, Zurich, Switzerland

[22] Filed: Dec. 10, 1974

[21] Appl. No.: 531,245

[30] Foreign Application Priority Data

Dec. 14, 1973 Switzerland .................. 17527/73

[52] U.S. Cl. ............................ 159/49; 159/13 A; 159/17 VS; 159/27 D; 159/46
[51] Int. Cl.² .................. B01D 1/00; B01D 1/22
[58] Field of Search ............ 159/13 A, 27 D, 46, 159/17 VS, 49, 47 R; 423/179, 182, 183, 203, 641

[56] References Cited

UNITED STATES PATENTS

| 1,597,809 | 8/1926 | Lavett | 159/28 R |
|---|---|---|---|
| 1,883,211 | 10/1932 | Wilson | 159/44 |
| 2,467,529 | 4/1949 | Hormel | 159/27 R |
| 2,519,618 | 8/1950 | Wilson et al. | 159/13 A |
| 2,562,495 | 7/1951 | Hulme | 159/49 |
| 2,698,779 | 1/1955 | Adams et al. | 159/47 R |
| 2,758,061 | 8/1956 | Geller | 159/13 A |
| 2,823,742 | 2/1958 | Ludin et al. | 159/24 R |
| 3,131,110 | 4/1964 | Duval | 159/47 R |
| 3,147,174 | 9/1964 | Cook | 159/13 A |
| 3,370,635 | 2/1968 | Kumm | 159/27 R |
| 3,380,806 | 4/1968 | Bradbury et al. | 159/17 VS |
| 3,872,910 | 3/1975 | Kuhnlein | 159/17 VS |

FOREIGN PATENTS OR APPLICATIONS

| 209,838 | 6/1960 | Austria | 159/27 B |
|---|---|---|---|
| 709,044 | 8/1931 | France | 159/17 VS |
| 71,271 | 10/1892 | Germany | 159/27 R |
| 75,824 | 10/1892 | Germany | 159/27 R |
| 181,239 | 2/1936 | Switzerland | 159/46 |
| 11,088 | 1905 | United Kingdom | 159/27 D |
| 20,972 | 1908 | United Kingdom | 159/27 R |

*Primary Examiner*—Jack Sofer
*Attorney, Agent, or Firm*—Robert A. Ostmann

[57] ABSTRACT

Method of concentrating sodium or potassium hydroxide liquids by means of a heated evaporator whereby for a preliminary pre-evaporation of the liquid to be concentrated the liquid is first of all heated by direct contact with the superheated evaporation vapors issuing from the evaporator; a suitable apparatus for this method is disclosed which comprises an evaporator and a pre-evaporator this arranged at the upstream side of the evaporator and heated by direct contact with the evaporation vapors issuing from the evaporator.

4 Claims, 2 Drawing Figures

CONCENTRATING SODIUM OR POTASSIUM HYDROXIDE

BACKGROUND OF THE INVENTION

The invention relates to a method of concentrating potassium or sodium hydroxide solution liquid by means of a heated evaporator and an apparatus for carrying out the method.

The concentration of sodium or potassium hydroxide liquids is characterised in that on the one hand there are high boiling points and therefore it is necessary to use heating media with suitably high heating temperatures, and on the other hand the transfer of the applied heat to the liquid to be concentrated requires a considerable outlay on expensive material, more particularly pure nickel, for the heat transfer surfaces. In modern methods which are already known, concentration takes place in tube bundle evaporators, and outside the tubes there is contact with a condensing or liquid heating medium of sufficient temperature, whereas in the interior of the tubes the liquid to be concentrated flows through in a once-through system and in concurrent flow with the evaporation vapours, either upwards from below as in a rising flow tube evaporator or downwards from above as in a down flow tube evaporator.

Associated with the outlet from the tube bundle is a separating system in order to separate the liquid vapour mixture into the individual components and to discharge the two components individually.

The issuing evaporation vapours are considerably superheated in accordance with the high boiling temperature, and as a result represent the most important quantity of heat which is discharged during the concentration process.

A known method of keeping these heat losses as small as possible, consists in carrying out the concentration operation under a vacuum and as a result the outlet temperature of liquid and vapours are approximately 80° C lower.

According to another known method the concentration operation is subdivided into one or more preliminary stages so that the result is achieved that only the vapour part-quantity of the last stage issues with the high superheating temperature.

In another known method, the superheated vapours issuing from the end stage at approximately atmospheric pressure are used for heating a pre-concentration stage, the vapours which form in the latter being precipitated in a condenser which is operated under a vacuum, and the cooled vapours of the end stage being delivered into the atmosphere.

SUMMARY OF THE INVENTION

The invention has as its object to provide a method which does not have the disadvantages of the aforesaid methods, that is to say which allows optimum utilisation of the superheating heat of the vapours whilst at the same time reducing the expensive heat transfer walls.

This object is achieved according to the invention in that for pre-evaporation of the liquid to be concentrated the said liquid is first of all heated by direct contact with the superheated evaporation vapours issuing from the evaporator.

It is advantageous if the liquid is preheated before pre-evaporation, preferably by means of a pre-heater.

The invention also provides an apparatus for carrying out the method according to the invention, which apparatus comprises an evaporator for concentration of the liquid, and a pre-evaporator which is arranged upstream of the said evaporator and is heated by direct contact with the evaporation vapours issuing from the evaporator, means being provided for supplying the liquid which is to be concentrated into the pre-evaporator and means for transferring into the evaporator the liquid which has been pre-concentrated in the pre-evaporator.

It is advantageous if the evaporator is constructed as a down flow tube evaporator at the upper inlet side of which the pre-evaporator is connected directly, preferably as a chamber enclosed in the upper portion of the evaporator. It is advantageous if the tube bundle of the down flow tube evaporator is held by means of two tube plates which are spaced from one another and which form the axial boundary of the heating compartment, that the tube bundle extends beyond the upper tube plate upwards into the chamber constructed as evaporator, and that at least one supply conduit is provided for introducing into this chamber the liquid which is to be concentrated, the aperture of the supply conduit being situated preferably directly above the upper tube plate.

BRIEF DESCRIPTION OF THE DRAWING

The invention will be explained by way of example hereinafter with reference to the drawings wherein.

DESCRIPTION OF THE PREFERRED EMBODIMENTS

Figure 1:
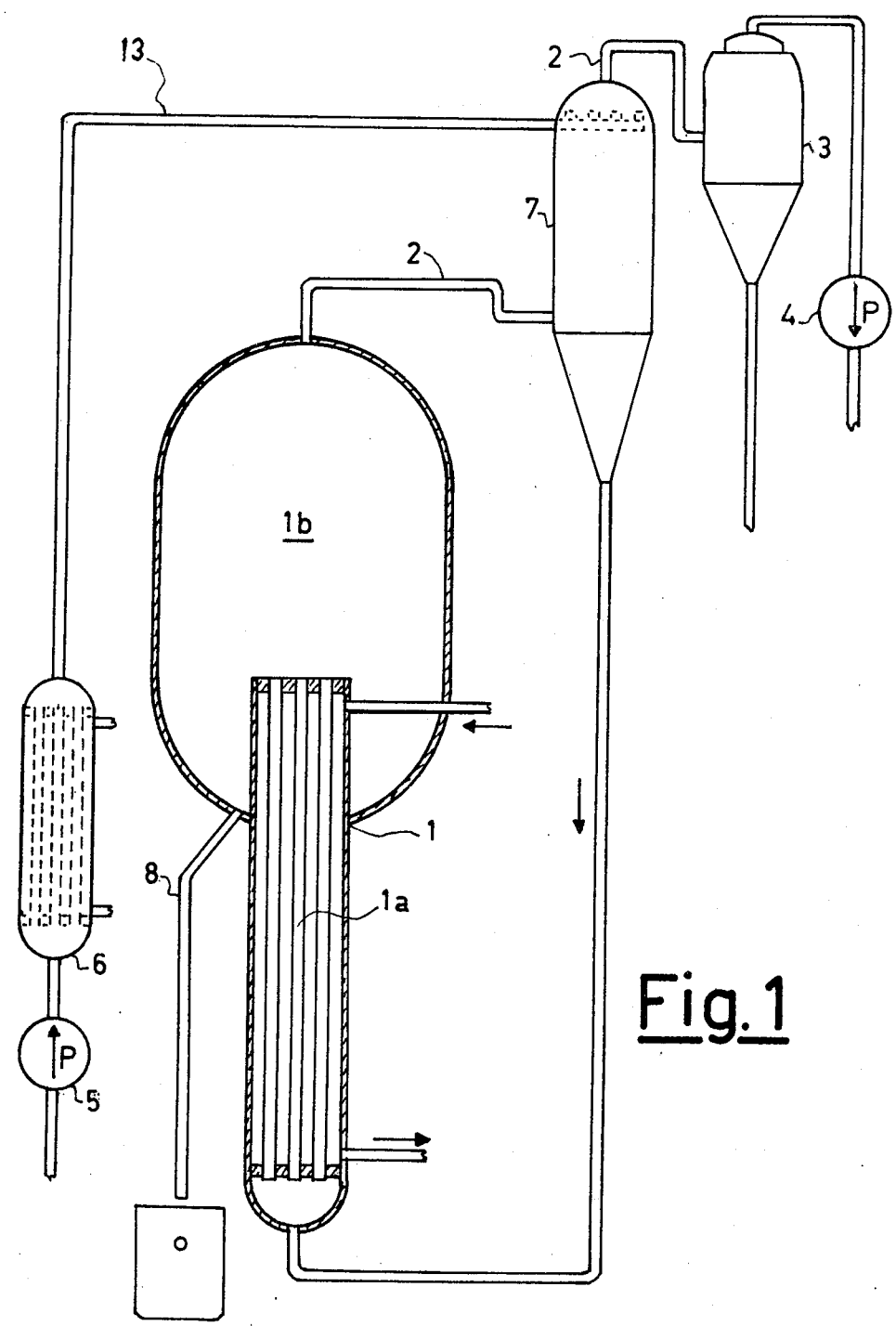
FIG. 1 shows a first constructional form of an apparatus according to the invention by way of example and FIG. 2 shows a second constructional form of an apparatus according to the invention by way of example.

The apparatus shown in FIG. 1 comprises an evaporator 1 which is constructed as a rising flow tube evaporator and comprises a vertical heating tube bundle 1a and an evaporator head 1b, a vapour conduit 2, a condenser 3 operating in accordance with the mixing or surface principle, a vacuum device 4 operating as a liquid ring pump or ejector device for removing by suction the non-condensable gases, a liquid feed pump 5 for supplying the liquid, a pre-heater 6 for the preliminary heating of the introduced liquid by means of steam and a directly heated pre-evaporator 7. The pre-evaporator 7 is heated by direct contact with the superheated evaporation vapours coming from the evaporator 1, these being brought into direct contact together with the additionally forming vapours in counter-current relatively to the liquid flowing through a cascade system in a free fall in the pre-evaporator 7. The pre-concentrated and heated liquid collects in the sump of the pre-evaporator 7 and flows, depending on the arrangement, because of the existing gradient or by means of an interposed pump (not shown) towards the evaporator 1, in order to pass through the concentration stage which is already known from other methods. The concentrated liquid is removed by way of a conduit 8 from the evaporator head 1b of the evaporator 1.

It is also possible to use this method in a similar manner with the use of down flow tube evaporators, the appropriate vapour and liquid circuits being connected with the pre-evaporator 7.

Figure 2:
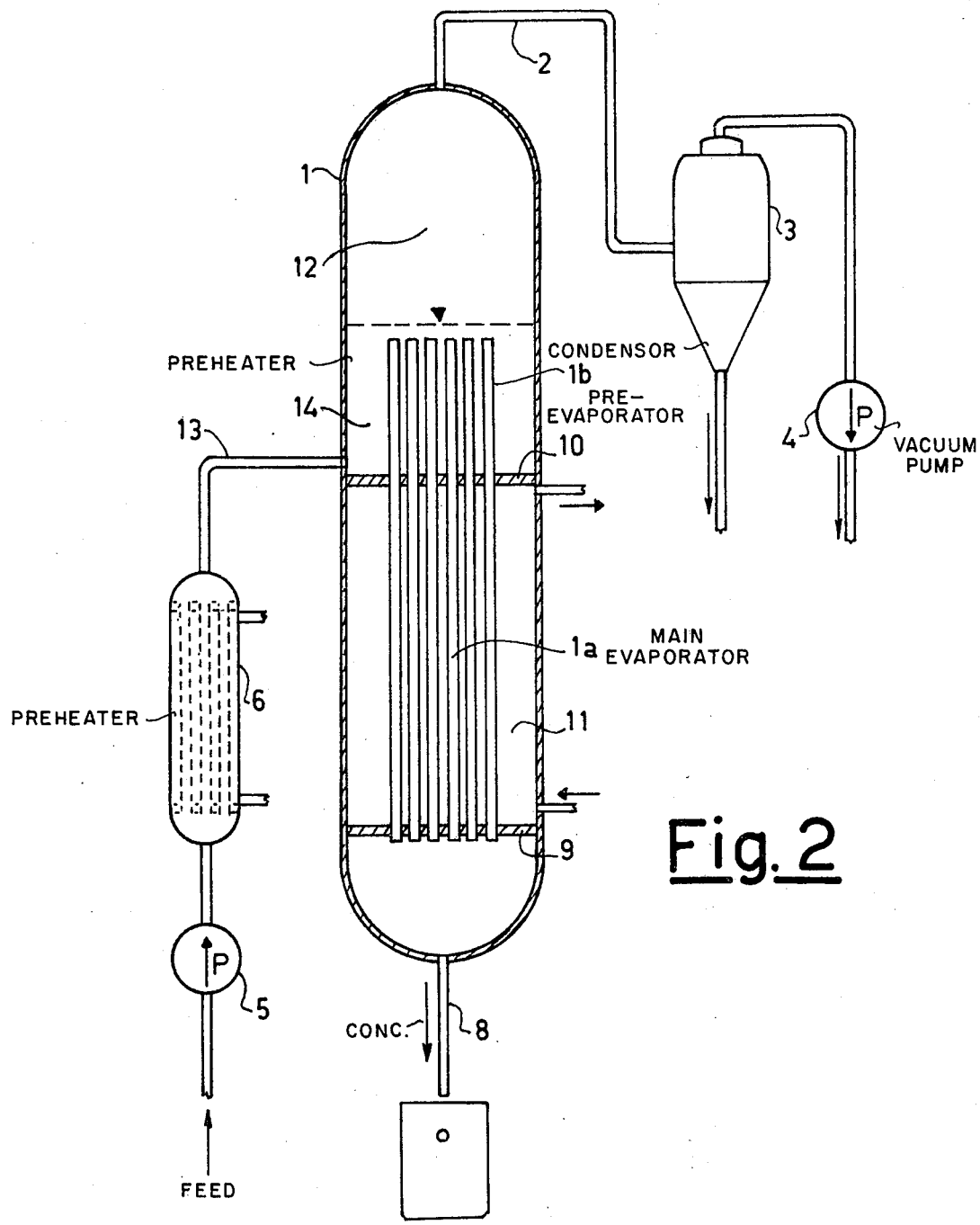

A further constructional form of an apparatus according to the invention shown by way of example is illustrated in FIG. 2. Parts which are similar to those in FIG. 1 are provided with the same references.

As this illustration shows, in this apparatus there is used an evaporator 1 which is constructed as a down flow tube evaporator and in contrast to known constructions is operated with a counter-current flow, the evaporation vapours being discharged upwards in opposition to the falling film of liquid flowing downwards from the upper tube inlet aperture. A continual contact between the evaporated-out superheated vapours and the relatively cool liquid flowing into the heated tube bundle 1a from above necessarily takes place, and as a result the internal surface of the liquid film at the same time takes part in the transfer of heat.

The tube bundle 1a of the down flow tube evaporator 1 is held by means of two tube plates 9 and 10 which are spaced from one another and which form the axial boundary of the heating compartment 11.

The tubes of bundle 1a have extensions 1b which project upward from tube plate 10 into a closed chamber 12 at the top of evaporator 1. The length of the extensions 1b is at least 10% of the length of the bundle 1a in heated compartment 11, and the solution to be concentrated is introduced into chamber 12 through a supply conduit 13 whose aperture is located directly above plate 10. As a result, there is formed in the lower portion of chamber 12 a liquid entry zone 14 which serves as a preheater. Thus, the fresh solution delivered through conduit 13 is first heated in zone 14, where it contacts the upward projecting tube extensions 1b, and then moves upward in chamber 12 and overflows into the tube extensions 1b. Thereafter, the preheated solution falls as a film on the inside surfaces of tube extensions 1b, where it is contacted directly by the ascending superheated vapors produced in the heated tubes 1a of the main evaporator. The tube extensions 1b afford a region of prolonged contact between the falling film and the ascending vapors wherein heat transfer between the two media effects evaporation of some water from the solution. In other words, pre-evaporation occurs in tube extensions 1b, and the solution is preconcentrated before it reaches the heated tube bundle 1a of the main evaporator. Moreover, the falling film is accelerated as it travels from the mouths of tube extensions 1b to the heated tube bundle 1a.

Following the preconcentration step, the falling film of the solution passes into and descends through the tubes 1a of the main evaporator. In this region, the solution is heated indirectly by the heat exchange medium in compartment 11 and is thereby concentrated to the final degree. The concentrated liquid is discharged from the sump of evaporator 1 by way of conduit 8. The vapors produced during main evaporation in tubes 1a, as well as those produced during pre-evaporation in tube extensions 1b, are, of course, discharged via conduit 2 and delivered to condenser 3.

Measurements on already known apparatus with vacuum operation showed an outlet temperature of the vapours issuing from the evaporator of about 355° C, corresponding to a thermal capacity of about 760 kc/kg. But if the vapours can be discharged as in the previously described apparatus after direct contact with the introduced liquid of for example 50 % concentration, then at 120° C they have a thermal capacity of about 650 kc/kg, and thus discharge about 15 % less heat into the condenser 3, and as a result also achieve a saving in the heat outlay for the entire concentration operation to the same extent.

Owing to the direct delivery of heat between the superheated vapours and the liquid which is to be concentrated the remaining heat transfer quantity still required is reduced and thus the necessary heat transfer surface made of nickel is also reduced.

Owing to the reduced vapour temperature, the advantage is also obtained at the same time that the vapour volume is reduced to about 65 % and consequently the separation space for the vapours can also be of smaller size.

I claim:

1. In a process for concentrating sodium or potassium hydroxide which includes the steps of indirectly heating the solution in a main evaporator of the upright tube type to evaporate water and produce superheated vapors, separating the superheated vapors from the resulting concentrate and condensing said separated vapors, the improvement which comprises
   a. causing solution being concentrated to pass downward through the tubes of the main evaporator as a falling film, and causing the superheated vapors produced during said concentration to pass upwardly through the tubes of the main evaporator;
   b. feeding solution to the tubes of the main evaporator downward through upward extensions of those tubes which are outside the region of said indirect heating, which extension have a length which is at least 10% of the heated length of the main evaporator tubes, and through which said superheated vapors produced in the main evaporator tubes ascend, the solution passing downwardly through said tube extensions being in contact with and heated directly by the ascending super-heated vapors to thereby effect pre-evaporation of water from that solution before the latter is indirectly heated and concentrated in the main evaporator tubes;
   c. withdrawing concentrated solution from the lower ends of the main evaporator tubes; and
   d. withdrawing the vapors produced during both main evaporation and pre-evaporation from the upper ends of the tube extensions and condensing same outside the evaporator.

2. A process as defined in claim 1 which includes the step of preheating the solution before it is delivered to said extensions of the main evaporator tubes.

3. A process as defined in claim 1 which includes the step of applying a vacuum to the main evaporator, whereby both main evaporation and pre-evaporation are effected at subatmospheric pressure within the tubes and their extensions.

4. A process as defined in claim 1 which includes the step of establishing and maintaining a body of solution to be concentrated which surrounds said extensions of the evaporator tubes and from which solution overflows into said extensions thereby preheating said body of solution.

* * * * *